United States Patent Office 3,560,569
Patented Feb. 2, 1971

3,560,569
PREPARATION OF GALLIC ACID
Charles D. Hurd, Evanston, Ill., assignor to Commercial Solvents Corporation, New York, N.Y.
No Drawing. Filed Nov. 8, 1967, Ser. No. 681,566
Int. Cl. C07c 65/02
U.S. Cl. 260—521                    2 Claims

ABSTRACT OF THE DISCLOSURE

A process for the preparation of gallic acid by condensing tricarballylic ester and an acetal of mesoxalic ester and hydrolyzing same.

BACKGROUND OF THE INVENTION

This invention relates to a process for the preparation of gallic acid. In a particular aspect, it relates to a process for the preparation of gallic acid from tricarballylic ester and an acetal of mesoxalic ester.

Gallic acid (3,4,5-trihydroxybenzoic acid) and its esters have a number of important uses in industry and in medicine. For example, they are used as antioxidants for organic monomers and polymers and in fats, in photographic developers, color formers for dyeing hair and leather, as stabilizers in pharmaceutical preparations, treatment of skin diseases, etc. Gallic acid is made principally by saponification of natural product tannic acids which are chiefly obtained from nutgalls gathered in Turkey and from Tara powder obtained from a plant species found at high altitudes in the Peruvian Andes. Gallic acid and pyrogallol, which is derived from it, are high-priced commodities which undoubtedly have been kept from many markets where they would be widely used at a lower price.

SUMMARY OF THE INVENTION

It is an object of this invention to provide a new process for the preparation of gallic acid.

A second object of this invention is to provide a process for the preparation of gallic acid from tricarballylic ester and an acetal of mesoxalic ester.

A third object of this invention is to provide a method for the preparation of an acetal of mesoxalic ester from glycerol.

A fourth object of this invention is to provide a method for the preparation of an acetal of mesoxalic ester from dichloromalonic ester and an alcohol or a glycol.

Other objects of this invention will be apparent to those skilled in the art from the description herein.

A process has been discovered for the production of gallic acid by reacting tricarballylic ester with an acetal of mesoxalic ester in the presence of a condensation-promoting base, e.g., sodium alkoxide, to form a carbocyclic condensation product, converting the resulting condensation product to gallic acid by acidifying with a suitable acid and heating with an excess of water. The acetal of mesoxalic ester is obtained by either of two methods. According to Method (A), glycerol is oxidized to tartronic acid, which is then esterified and further oxidized to mesoxalic ester. The ketone function of this ester is next protected by converting it to an acetal. Methods for doing this include:

(1) Reacting with an alkylene glycol in the presence of an acid catalyst.

(2) Reacting with an alcohol to produce a hemiacetal, then reacting the hemiacetal with dihydropyran,

in the presence of an acid catalyst.

(3) Reacting with water to form a hydrate and reacting the resulting hydrate with dihydropyran in the presence of an acid catalyst.

Method (B) is also provided for the production of acetals by reacting a dihalomalonic ester with sodium alkoxide, or with ethylene glycol in the presence of a base.

DETAILED DESCRIPTION

The reactions which form the process of this invention are discussed in detail below and can be illustrated by the following typical equations:

I. FORMATION OF THE MESOXALIC ESTER ACETALS

A. From Glycerol

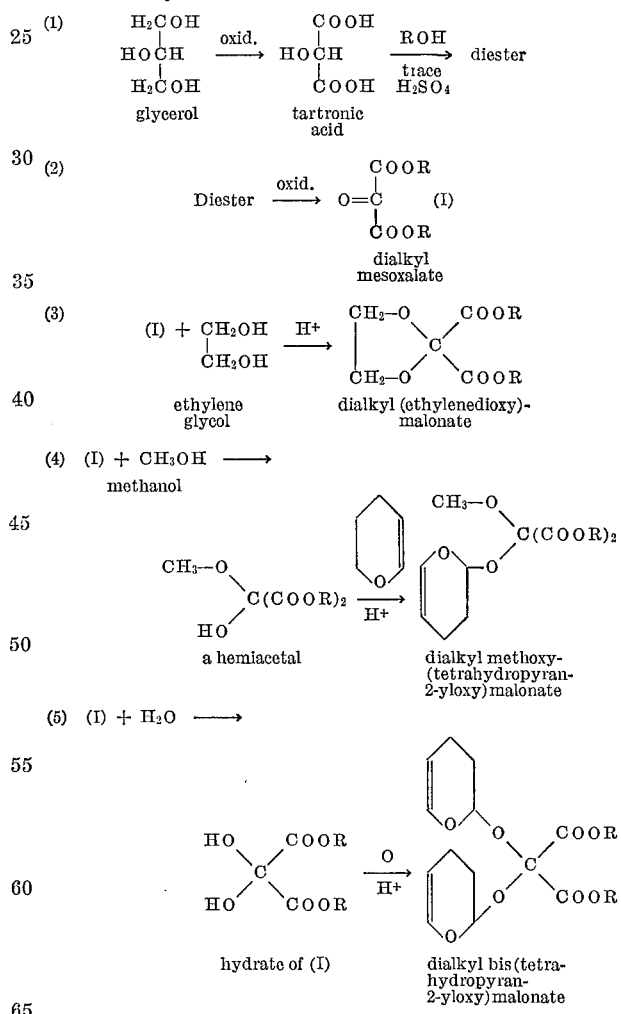

R is an alkyl radical usually, but not necessarily, of from 1 to 4 carbon atoms, preferably methyl.

B. From dihalomalonic ester (6)
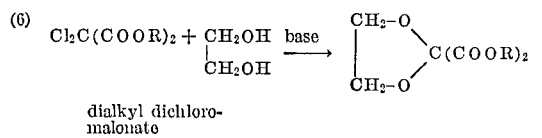

dialkyl dichloro-
malonate (7)
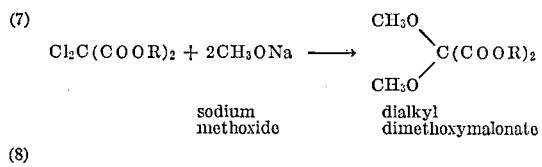

sodium          dialkyl
methoxide    dimethoxymalonate (8)

II. FORMATION OF GALLIC ACID

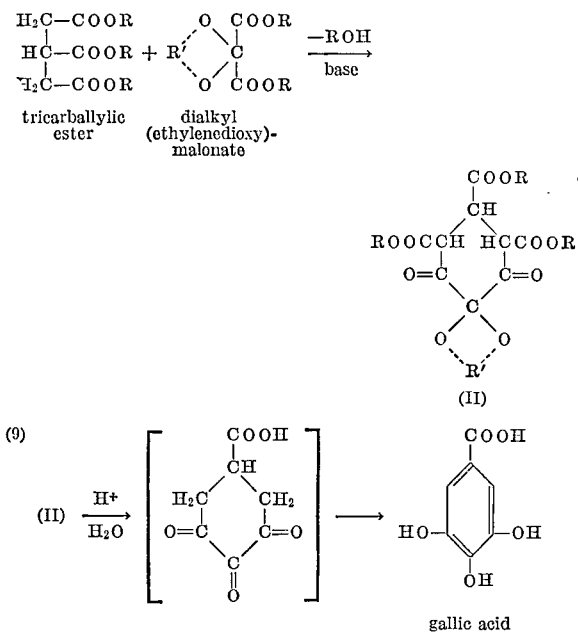

In Equations 6–9, R has the same meaning herein before defined and R' represents an alkylene group, or two alkyl groups, or two tetrahydropyranyl groups, or an alkyl and a tetrahydropyranyl, formed according to Equations 3–7, inclusive.

Formation of tartronic ester

According to Method (A), the acetal of mesoxalic ester is provided by the oxidation of glycerol to tartronic acid which is then esterified, Equation 1, and the ester is further oxidized to dialkyl mesoxalate, which is then reacted with a suitable reagent to protect the ketone function by acetal formation.

The oxidation of glycerol to tartronic acid is effected under mild oxidation conditions by contacting glycerol with an oxidizing agent, many of which are known. The oxidation reaction is conveniently, but not necessarily, conducted in the presence of a suitable solvent, e.g., water. When water is used, it is removed, e.g., by evaporation under vacuum, before the esterification step. Suitable oxidizing agents include, but are not limited to, oxygen, nitrogen dioxide or nitric acid, preferably air. When oxygen or air is used as the oxidizing agent, it is generally advantageous to conduct the reaction in the presence of an oxidizing catalyst at elevated temperatures. When oxygen is used in the oxidation step, it can be conveniently supplied by air, or as a compressed gas.

When nitrogen dioxide is selected as the oxidizing agent, the nitric oxide resulting therefrom is conveniently converted back to the dioxide by exposure to oxygen or air. The dioxide is then recycled to the oxidation step.

Any suitable oxidation catalyst, many of which are known, can be employed in the oxidation step. Finely divided platinum generally, but not necessarily, in an amount of about 0.1 g. to 1.0 g. per 100 g. of glycerol, is a preferred catalyst. When the reaction is complete, the product is usually filtered to remove catalyst, but it is not necessary to do so.

The temperature employed for the oxidation reaction is from about 40° C. to about 100° C. Higher temperatures may promote decarboxylation. Generally, a temperature within the range of 50 to 80° C. is preferred, and a temperature within 60–70° C. is particularly preferred.

Atmospheric pressure is generally preferred for this reaction, but elevated pressures up to 1000 p.s.i.a. can also be employed.

The tartronic acid resulting from the oxidation of glycerol is esterified with any suitable alcohol, generally a lower alkyl alcohol for reasons of economy, such as methanol, ethanol, 1- or 2-propanol or butanol, and methanol is preferred. However, when the tartronic acid is present in an aqueous solution, butanol has the advantage that it forms an azeotrope with water and simplifies the removal of water before and during the esterification step. The esterification step is carried out according to methods known in the art, i.e., in the presence of sulfuric acid or p-toluenesulfonic acid as an esterification catalyst and under reflux conditions. The water of reaction is removed as it forms.

Formation of mesoxalic ester

The tartronic ester is oxidized to the mesoxalic ester under oxidation conditions, Equation 2. Suitable oxidation conditions include air, oxygen or chlorine as the oxidizing agent in the presence of an oxidation catalyst, many of which are known, e.g., platinum, at a temperature of from 50 to 130° C., preferably 100–120° C., and at a pressure from atmospheric to about 1000 p.s.i.a. Generally, but not necessarily, the amount of catalyst employed is from about 0.1 g. to 1.0 g. per 100 g. of tartronic ester. Advantageously, but not necessarily, the reaction is conducted in the presence of a suitable solvent, e.g., toluene or xylene, when air or oxygen is the oxidizing agent. When the reaction is determined to be complete, the reaction mixture is cooled and filtered to remove the catalyst and the resulting mesoxalic ester is used to form the acetal.

Formation of acetals (A) According to the preferred embodiment of this invention, the acetal is obtained by reacting an alkylene glycol with the mesoxalic ester in about a 1:1 mole ratio. Any acetal-forming glycol can be used, but ethylene glycol or propylene glycol are preferred. Ethylene glycol is particularly preferred, and when it is used, the acetal formed is dialkyl(ethylenedioxy)malonate, Equation 3. A trace, i.e., from 0.001 to about 0.1 molar equivalent, of sulfuric acid or p-toluenesulfonic acid is added, and preferably, but not necessarily, an azetrope-former with water is also added. Suitable azeotrope formers include, but are not limited to, benzene, toluene and xylene. The reaction mixture is then heated under reflux while removing the water azeotrope and returning the azeotrope-former to the reaction vessel until the acetal formation is complete. When the reaction is complete, the azeotrope-former can be removed by distillation, but generally it is left in the reaction mixture. The contents are permitted to cool somewhat, and the acid catalyst is then neutralized with a suitable base, such as sodium hydroxide, potassium hydroxide, or sodium carbonate, or perferably the reaction mixture is washed once or twice with water to extract the acid and the catalyst.

In accordance with another embodiment of this invention, the mesoxalic ester is reacted in a 1:1 mole ratio with any suitable alcohol, e.g., methanol, to form the hemiacetal. A molar equivalent of dihydropyran is added, a trace of a suitable acid catalyst, e.g., sulfuric or p-toluenesulfonic acid, 0.001 to 0.1 mole, is added, the mixture is heated to 50 to 80° C. for a suitable period of time and the reaction as represented by Equation 4 is thereby effected.

In accordance with a third embodiment of this invention, the mesoxalic ester is reacted with water to form the hydrate which is then reacted with dihydropyran in a mole ratio of about 1 of the hydrate to 2 of dihydropyran in the presence of an acid catalyst under acetal-producing conditions. This reaction is represented by Equation 5.

(B) According to the embodiment of Method (B), the acetal of mesoxalic ester is provided by treating a dialkyl dihalomalonate with an alkylene glycol, e.g., ethylene glycol, in the presence of a base, e.g., a tertiary amine, such as triethylamine or pyridine, under acetal-producing conditions, Equation 6. Preferably, however, the dihalomalonic ester is treated with sodium methoxide under conditions suitable to produce the acetal of mesoxalic dialkyl ester, Equation 7. Suitable conditions include a mole ratio of about 1:1 for the reaction of Equation 6 or 1:2 for the reaction of Equation 7, a temperature of from about 20 to about 70° C., preferably from about 40 to about 70° C., and in solution in methanol. Dihalomalonic diester can be provided by any suitable method, several of which are known. Suitable dihalomalonic esters include the chloro-, bromo- an iodo-esters. The esters can be those of any ester-forming alcohol, generally the lower alkyl esters of from 1 to 4 carbon atoms for reasons of economy. Dimethyl dichloromalonate is a particularly preferred ester.

Formation of gallic acid

Tricarballylic ester is provided by any suitable method, many of which are known. It can be obtained from citric, aconitic or itaconic acids. Any ester is suitable in the practice of this invention, but an ester of a lower alkyl alcohol of from 1 to 4 carbon atoms is generally preferred. A molar equivalent of the ester is added to catalytic amounts of a typical Claisen condensation base, such as from 0.01 to 1 molar equivalent, preferably 0.05 to 0.5, of sodium methoxide in methanol or sodium ethoxide in ethanol, to form the carbanion of the tricarballylic ester. This is then reacted with a molar equivalent of an acetal of mesoxalic ester to effect a carbocyclic condensation product. The condensation reaction is carried out at a temperature of from about 40 to 100° C., preferably from 50 to 80° C.

When the condensation reaction is determined to be complete, the carbocyclic condensation product is converted to gallic acid by acidifying with a suitable organic or inorganic acid and heating with an excess of water. During this step, the acetal group is converted to the carbonyl, the ester groups are hydrolyzed to carboxylic acid groups, and partial decarboxylation occurs.

The reaction is conducted in the presence of sufficient acid to neutralize the base of the preceding step and provide an excess of acid in the solution. Any acid capable of neutralizing the base can be used, but either sulfuric acid or hydrochloric acid is preferred for convenience and economy. The excess of acid is sufficient to provide a hydrogen ion concentration of from about 0.001 to about 1 mole per liter. At least 3 moles per mole of water per mole of cyclic condensation product are required and ample excess is generally added. The reaction is effected at a temperature below that at which decarboxylation to pyrogallol occurs, i.e., below about 100° C., preferably from about 40 to about 90° C., until the conversion of the cyclic condensation product to gallic acid is determined to be complete. The mixture is then chilled and the precipitated gallic acid is separated.

The gallic acid so produced can be refined or it can be utilized as is.

The following examples further illustrate the process of this invention.

EXAMPLE 1

Synthesis of gallic acid by Method A

One mole of glycerol, 92 g., is transferred to a reaction vessel equipped with an air sparger, a reflux condenser and a take-off head. Platinum catalyst, 0.5 g., and about 100 ml. of water are added, and the mixture is heater to within the range of 60–70° C. A stream of air is introduced into the reaction mixture, and the heating is continued at below 70° C. until it is determined that the glycerol has been substantially converted to tartronic acid. After filtering off the platinum catalyst, water is evaporated from the filtrate under diminished pressure. Benzene is added to the residue and the remaining water is removed by azeotropic distillation at 65–80°. Methanol (300–350 ml.) is added to the residue. When homogeneous, about 8 ml. of concentrated sulfuric acid are added, the mixture is refluxed for two hours, and then is neutralized, concentrated, and washed twice with water. Additional platinum catalyst, 0.5 g., is added, the mixture is heated to reflux and air is again sparged through the mixture at 100–120° until the tartronic diester is converted to mesoxalic diester. The mixture is cooled to below 50° C., filtered to remove catalyst, and returned to the reaction vessel. Ethylene glycol, 62 g., toluene, 100 cc., and sulfuric acid, 0.5 g., are added, the reaction mixture is heated to reflux while removing the toluene-water azeotrope until water evolution ceases. The reaction mixture is again cooled to below 50° C., washed with an equal volume of water to remove the sulfuric acid, and then is returned to the reaction vessel. Yield of acetal-ester is about 0.8 mole of dimethyl(ethylenedioxy)malonate.

Tricarballylic ester (trimethyl carballylate), 175 g. (about 0.8 mole), is mixed with about 10 g. of sodium methoxide dissolved in methanol and the mixture is added to the acetal-ester in the reaction vessel. The reaction mixture is heated under reflux until condensation is determined to be complete.

The sodium methoxide is neutralized by dilute sulfuric acid, the methanol distilled off, and 2 to 3 volumes of water are added. Then 5–10 cc. of concentrated sulfuric acid are added and the mixture is heated under reflux until carbon dioxide evolution slackens. The mixture is distilled to remove methanol and about 100 cc. of the water. The mixture containing gallic acid and sodium sulfate is chilled, filtered, and the filter cake is washed several times with cold water to remove the sodium sulfate. The remaining crude gallic acid is dried and is suitable for many uses without further refining.

The filtrate, which contains water, glycol, sodium sulfate and gallic acid, is concentrated under reduced pressure. After the glycol is removed, water is added to the residue. The insoluble portion containing gallic acid and usually some of the sodium sulfate is removed by filtration, washed and dried as before.

EXAMPLE 2

Synthesis of gallic acid by Method B

The procedure of Example 1 is repeated except that the following synthesis of dimethyl dimethoxymalonate is employed:

Dimethyl dichloromalonate, 201 g., is treated with a solution of sodium methoxide in methanol that contains 46 g. of sodium. The mixture is refluxed until no more sodium chloride separates. The mixture is filtered and methanol is distilled from the filtrate. The residual acetal, dimethyl dimethoxymalonate, is then reacted with trimethyl tricarballylate in the presence of sodium methoxide to produce gallic acid according to the procedure of Example 1.

EXAMPLE 3

The experiment of Example 2 is repeated except that a molar equivalent of ethylene glycol in the presence of 0.1 molar equivalent of triethylamine is substituted for sodium methoxide in methanol. The dimethyl(ethylenedioxy)malonate thereby produced is used for the production of gallic acid according to the procedure of Example 1.

EXAMPLE 4

The experiment of Example 1 is repeated except a molar equivalent of methanol is substituted for ethylene glycol in the reaction with dimethyl mesoxalate to produce the hemiacetal. A molar equivalent of dihydropyran and 2 ml. of concentrated sulfuric acid are added and the mixture is heated to 80° C. for 30 minutes. The product obtained is dimethyl methoxy(tetrahydropyran-2-yloxy)malonate which is substituted for dimethyl(ethylenedioxy)malonate in the reaction with trimethyl carballylate.

The reaction product is acidified, hydrolyzed and processed for gallic acid in accordance with the procedure of Example 1.

EXAMPLE 5

The experiment of Example 1 is repeated except that the dimethyl mesoxalate is reacted with water to form the hydrate. The latter is then reacted with 2 molar equivalents of dihydropyran in the presence of 0.1 molar equivalent of sulfuric acid. The resulting dimethyl bis(tetrahydropyran - 2 - yloxy)malonate is substituted for dimethyl(ethylenedioxy)malonate in the reaction with trimethyl carballylate.

The reaction product is acidified, hydrolyzed and processed for gallic acid in accordance with the procedure of Example 1.

I claim:
1. A process for the production of gallic acid consisting of the steps of:
  (a) reacting an acetal of mesoxalic ester with tricarballylic ester in about a 1:1 mole ratio in the presence of sodium alkoxide and at a temperature of from about 40° to about 100° C. to effect a carbocyclic condensation product,
  (b) converting said condensation product to gallic acid by acidifying and heating said condensation product with an excess of water at a temperature below about 100° C. to effect conversion of said condensation product to said gallic acid.
2. The process of claim 1 wherein said condensation product is converted to gallic acid by heating said condensation product in the presence of from 0.001 to about 1 equivalent of sulfuric or hydrochloric acid catalyst and an excess of water at a temperature of from about 40° to about 90° C. to effect conversion of said condensation product to gallic acid.

References Cited

Morrison and Boyd: Organic Chemistry (1959), pp. 366, 367, 634–636.

LORRAINE A. WEINBERGER, Primary Examiner

E. J. GLEIMAN, Assistant Examiner

U.S. Cl. X.R.

260—340.9, 345.8, 483, 484, 531

UNITED STATES PATENT OFFICE
CERTIFICATE OF CORRECTION

Patent No. 3,560,569  Dated February 2, 1971

Inventor(s) Charles D. Hurd

It is certified that error appears in the above-identified patent and that said Letters Patent are hereby corrected as shown below:

Column 2, lines 45-50, that portion of the formula reading

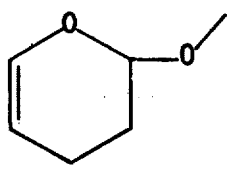   should read   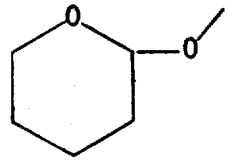

Column 2, lines 55-65, the right hand part of the equation should appear as follows:

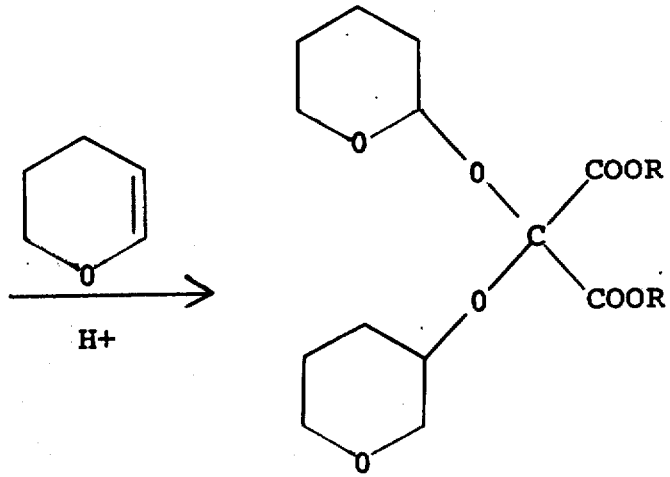

Signed and sealed this 14th day of January 1975.

(SEAL)
Attest:

McCOY M. GIBSON JR.
Attesting Officer

C. MARSHALL DANN
Commissioner of Patents